W. F. EHLERS.
Wheel Hub.
No. 105,926.  Patented Aug. 2, 1870.
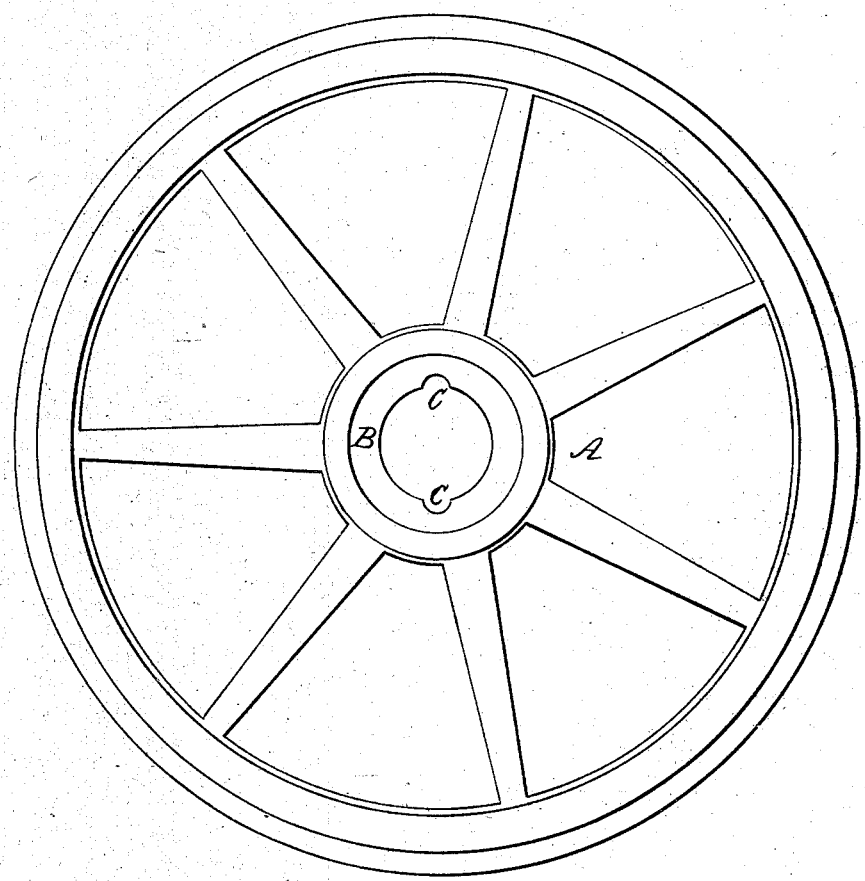
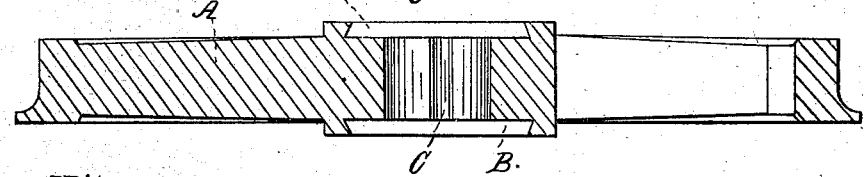

UNITED STATES PATENT OFFICE.

WILLIAM F. EHLERS, OF POTTSVILLE, PENNSYLVANIA.

IMPROVED WHEEL-HUB.

Specification forming part of Letters Patent No. 105,926, dated August 2, 1870.

*To all whom it may concern:*

Be it known that I, WILLIAM F. EHLERS, of Pottsville, in the county of Schuylkill and State of Pennsylvania, have invented an Improved Mode of Constructing the Hubs of Wheels that Run Loose on Axles or Shafts, of which the following is a specification:

Nature and object of the invention relate to constructing the hub of a wheel in such a manner as to allow a lining of suitable metal to be run into it, forming a true surface for its bearings.

The advantages of this mode of constructing the hubs are, to entirely dispense with boring for the axle or shaft, and of facing the hub for the collar, and also affords an easy method of repairing, when required.

Figure 1 is a front view of the hub A, showing the slots C C and recess B. Fig. 2 is an interior view, showing the hub A, slot C, and recesses B B.

I construct the hub A as shown at Figs. 1 and 2, having the recesses in both faces, as shown at B B, to hold the lining metal that forms a face for the collars; and the slots C C forming ribs on the lining metal to prevent it from turning, and also connecting the recesses B B together, and facilitate the filling of the hubs, the main hole being larger than the shaft or axle, to allow a suitable thickness of the lining metal between them.

Being formed in this manner by the core in casting, the wheel is put onto a suitable plate or bed, having a shaft the size of the axle projecting through the hub, and adjusted in the center of the rim. The lining metal is now run in, filling up the recesses B B and slots C C and the space around the shaft, thereby forming a smooth surface for the axle or shaft, and a true face for the collars, with the advantages before stated.

I claim as my invention—

The construction of the hub A with the slots C C and recesses B B, in the manner and for the purpose herein described.

WM. F. EHLERS.

Witnesses:
 A. T. MORGAN,
 E. ANDREWS.